Nov. 11, 1941.   W. K. EDWARDS   2,262,317
WATER SAVER
Filed Sept. 23, 1940
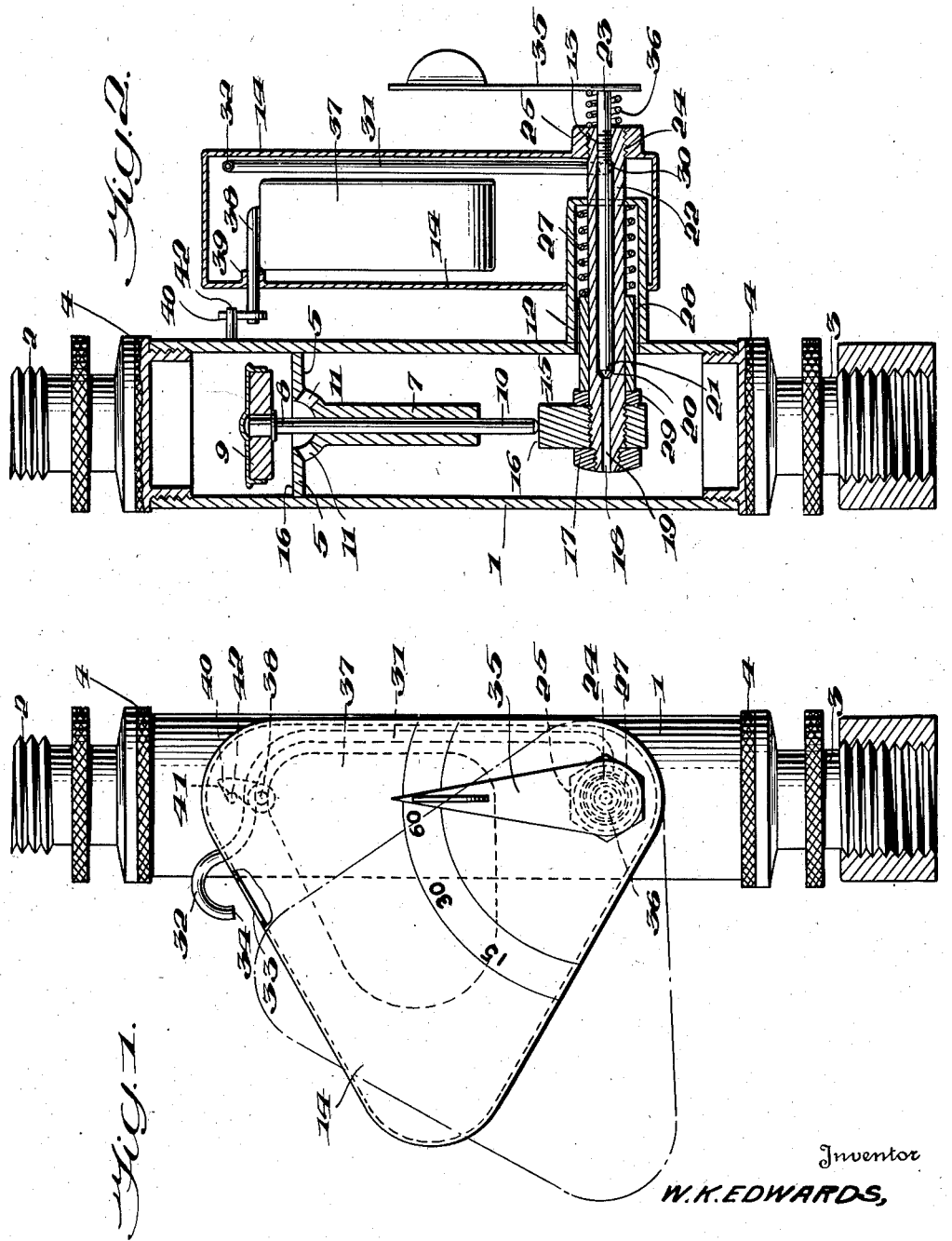
Inventor
W. K. EDWARDS,
By
Attorneys.

Patented Nov. 11, 1941

2,262,317

UNITED STATES PATENT OFFICE 2,262,317

WATER SAVER

William K. Edwards, Big Spring, Tex., assignor of ten per cent to T. J. Settle, Dallas, Tex.

Application September 23, 1940, Serial No. 358,010

9 Claims. (Cl. 137—139)

The present invention relates to a water saver, or to a control means for automatically shutting off the flow of water or other liquid after the lapse of a definite period of time.

More particularly the present invention relates to a device which may be attached to water sprinklers or sprayers, and is constructed to be attached in the line between the source of flowing water, such as a hydrant, and the hose of the sprinkler, such as a lawn sprinkler, although the device is not limited to such use.

An object of the invention is to provide an automatic flow cut-off for sprinklers whereby after the sprinkler has been turned on, such device will automatically shut off the flow of water after a suitable interval of time, to prevent the wastage of water and the flooding of the section of lawn being sprinkled.

Another object of the invention is to provide an automatic fluid shut-off having means for adjustment, whereby to vary the length of time the sprinkler is allowed to operate.

Other objects and advantages will appear hereinafter throughout the specification.

In the drawing:

Figure 1 is a front elevation of the device, and

Figure 2 is a vertical section through the flow conduit and control tank, taken at right angles to the position shown by Figure 1.

In the drawing which shows one embodiment of the invention, the numeral 1 indicates a conduit preferably constructed of metal having screw threaded coupling means 2 and 3, the member 2 of which may be attached directly to a hydrant, not shown. It is essential that the device be supported in a vertical or substantially vertical position. The coupling 3 may be attached to one end of a hose (not shown), whose other end may have attached thereto the sprinkler head. Cap members 4 threadedly engage the opposite ends of the conduit to make the same watertight, and the coupling members 2 and 3 may be swiveled thereon. The swivel mountings of these coupling members are not essential, however, to this invention.

Mounted within the tubing by welding or other permanent attaching means, is a valve seat 5 having a seating surface 6, and a downwardly extending valve stem guide 7, which guides the valve stem 10 of the valve 8. The valve is provided with a disk or head 9 which, when seated on the surface 6, prevents passage of water through the passages 11 of the valve seat.

The numeral 12 indicates a bearing sleeve rigidly attached to the conduit 1 for rotatably supporting the shaft 22 on which is rigidly mounted the tank 14. On one end of the shaft is rigidly mounted the cam 15 which is adapted when rotated to the position shown in Figure 2, to raise the valve head 9 from its seat 6. Inasmuch as both the tank 14 and cam 15 are rigidly mounted on the shaft 22, the movements of the tank control the position of the cam, whose high point 16 will hold the valve in its unseated position when the tank is in vertical or substantially vertical position, as shown in Figure 2.

The cam may be held in locked position on the shaft by a nut 17 having one or more apertures 18 which communicate with an aperture 19 within the shaft 22. The aperture 18 has an enlarged section to provide a needle valve seat 20 for the needle valve 21, the stem 23 of which is threadedly engaged with internal threads 13 within the shaft 22. This shaft has external threads 24 which engage with the threads of enlargement 25 on the tank 14. The bearing sleeve 12 is provided with an abutment against which one end of the spring 27 bears, and whose opposite end is in engagement with one end of the sleeve 28. The opposite end of this sleeve bears against a leather washer 29 which engages the cam 15. The hollow shaft 22 has a side aperture 30. Attached to the shaft 22 so as to surround the aperture 30, is a small hollow tube 31 preferably made of copper, whose upper end 32 is in the shape of a gooseneck. This tube upper end including the gooseneck, extends through an aperture 33 in the top of the tank 14, and has an open end 34.

The needle valve shaft 23 has an indicating lever 35 rigid therewith for adjusting manually the position of the needle valve 21 toward or away from its seat to thereby regulate the amount of liquid passing to the tank via tube 31. A tension spring 36 is interposed between the lever 35 and the enlargement 25 to prevent the needle valve from becoming loose in the threads 13.

The float 37 has a supporting arm 38 which extends outwardly of the tank through bearing 39. Attached to the arm of the tank is a latch member 40 having a notch 41 which is adapted to engage, in one position, the stud 42 which is mounted on the conduit 1, when the parts are in the position shown in Figure 2. Suitable packing (not shown) may be provided to prevent water passing out of the tank adjacent the enlargement 25, needle shaft 23, bearing 39 and around bearing sleeve 12.

The operation of the device is as follows:

Assuming the socket 2 has been connected to the outlet of a hydrant so that the device is in a vertical position and the parts in the position shown in Figure 2. The nipple 3 may then be connected to a sprinkler hose whose other end is connected to a sprinkler nozzle. After the water has been turned on, water passes through the tubing to the sprinkler nozzle, some water finding its way through apertures 18 and 19 past the needle valve 21, along the needle valve shaft 23 which is smaller than the enlarged portions of apertures 19, out aperture 30 and into and through tube 31 and out the open end 34 thereof, to gradually fill the tank 14, which is in the position shown in Figure 1. As the water rises in the tank the float 37 rises with it, causing rotation of arm 38. After the water has risen nearly to the top of the tank, the notch 41 becomes disengaged from stud 42, due to rotation of arm 38 in bearing 39. The tank is now badly overbalanced and its weight having been released by latch member 40, rotates in a counter-clockwise direction, Figure 1, to a position where it is substantially horizontal. This movement causes the cam 15 to rotate so that only its low portion is adjacent to the valve stem 10. The pressure of the water above the valve head 9 now immediately causes the same to seat on the valve seat 6, thus shutting off the flow of water to the sprinkler head.

The open-ended tube 31 provides a means of determining by sight the amount of water, (number of drops), flowing into the tank 14 within a given period of time. This having been determined, (assuming the valve 9 is open as in Figure 2), the time required for filling the tank can be regulated by adjustment of the needle valve 21 by moving the lever 35 in a direction either toward a further opening, or closing of the needle valve 21, so as to permit either a larger or smaller quantity of water to pass to the tank via the tube 31, within a given time. It is to be understood that no water passes to the tank 14 except that which passes through the apertures 18, 19, 30, tube 31, and out the end 34 thereof and into the tank through the aperture 33 thereof.

The device may be reset by rotating the tank (much of the water therein having run out onto the ground through aperture 33 when the tank moved to its released position), to the position shown in the figures and causing the notch 41 of latch 40 to engage stud 42.

I desire to be limited in the practice of my invention only to the extent set forth in the appended claims, and that the showing in the drawing and the above description illustrates only one embodiment of my invention.

What I claim is:

1. Control means including a fluid conduit, a valve for controlling the flow of fluid in said conduit, means for operating said valve including a cam, a tank rigidly attached to said cam and rotatably mounted on said conduit, a float in said tank, a latch means on said float extending through said tank and engageable with said conduit, and a passageway extending from said conduit to said tank.

2. Control means including a fluid conduit, a valve for controlling the flow of fluid in said conduit, means for operating said valve including a cam, a tank rigidly attached to said cam and rotatably mounted on said conduit, a float in said tank, a latch means on said float extending through said tank and engageable with said conduit, and a passageway extending from said conduit to said tank, and adjustable means for regulating the amount of fluid passing through said passageway.

3. Control means including a fluid conduit, a valve for controlling the flow of fluid in said conduit, means for operating said valve including a cam, a tank rigidly attached to said cam and rotatably mounted on said conduit, a float in said tank, a latch means on said float extending through said tank and engageable with said conduit, and a passageway extending from said conduit to said tank, and adjustable means for regulating the amount of fluid passing through said passageway, said adjusting means including a needle valve and a lever located adjacent said tank and mounted on said needle valve.

4. Control mechanism including a fluid conduit, a valve for controlling said conduit, a shaft extending through a side wall of said conduit and having means on one end thereof for releasing said valve, a tank rigidly mounted on said shaft and rotatable therewith, a float in said tank, said float having a latch connected thereto and engageable with said conduit to hold said tank in latched position.

5. Control mechanism including a fluid conduit, a valve for controlling said conduit, a shaft extending through a side wall of said conduit and having means on one end thereof for releasing said valve, a tank rigidly mounted on said shaft and rotatable therewith, a float in said tank, said float having a latch connected thereto and engageable with said conduit to hold said tank in latched position, said shaft having a passageway communicating with the interior of said conduit and the interior of said tank.

6. Control mechansim including a fluid conduit, a valve for controlling said conduit, a shaft extending through a side wall of said conduit and having means on one end thereof for releasing said valve, a tank rigidly mounted on said shaft and rotatable therewith, a float in said tank, said float having a latch connected thereto and engageable with said conduit to hold said tank in latched position, said shaft having a passageway communicating with the interior of said conduit and the interior of said tank, a tube located within said tank and surrounding the outlet from said passageway, said tank having an aperture in the upper portion thereof, and said tube having a portion and an outlet located above said aperture when said tank is in latched position, whereby the amount of fluid passing out of said outlet and into said tank may be observed.

7. Control mechanism including a fluid conduit, a valve for controlling said conduit, a shaft extending through a side wall of said conduit and having means on one end thereof for releasing said valve, a tank rigidly mounted on said shaft and rotatable therewith, a float in said tank, said float having a latch connected thereto and engageable with said conduit to hold said tank in latched position, said shaft having a passageway communicating with the interior of said conduit and the interior of said tank, a tube located within said tank and surrounding the outlet from said passageway, said tank having an aperture in the upper portion thereof, and said tube having a goosenecked portion and an outlet located above said aperture when said tank is in latched position, whereby the amount of fluid passing out of said outlet and into said tank may be observed.

8. A control means for automatically shutting off the flow of water, comprising a conduit having coupling means at each end thereof, a valve and a valve seat in said conduit, means for holding said valve off its seat, including a rotatable shaft, a weight actuated means for rotating said shaft including a tank rigidly mounted thereon, a float in said tank, means for supporting said float comprising a pivot extending through said tank, a latch on the end of said pivot having means for engaging said conduit, and a passageway extending from said conduit to said tank, whereby when said tank becomes filled with fluid from said conduit said float will actuate said latch to release said tank for pivotal movement, thereby to actuate said shaft and release said valve by actuation thereof.

9. A control means for automatically shutting off the flow of water, comprising a conduit having coupling means at each end thereof, a valve and a valve seat in said conduit, means for holding said valve off its seat, including a rotatable shaft, a weight actuated means for rotating said shaft including a tank rigidly mounted thereon, a float in said tank, means for supporting said float comprising a pivot extending through said tank, a latch on the end of said pivot having means for engaging said conduit, a passageway extending from said conduit to said tank, whereby when said tank becomes filled with fluid from said conduit said float will actuate said latch to release said tank for pivotal movement, whereby to actuate said shaft and release said valve by actuation thereof, a tube mounted on said shaft and having an outlet located above said tank, said tank having an aperture located beneath said outlet when said tank is in substantially its vertical position and with said latch in engagement with said conduit, whereby the amount of fluid passing through said tube and into said tank may be observed.

WILLIAM K. EDWARDS.